United States Patent [19]
Kim

[11] Patent Number: 5,606,372
[45] Date of Patent: Feb. 25, 1997

[54] VIDEO SIGNAL DECODING APPARATUS CAPABLE OF REDUCING BLOCKING EFFECTS

[75] Inventor: Sang-Ho Kim, Seoul, Rep. of Korea

[73] Assignee: Daewoo Electronics Co., Ltd., Seoul, Rep. of Korea

[21] Appl. No.: 431,524

[22] Filed: Apr. 28, 1995

[30] Foreign Application Priority Data

Apr. 30, 1994 [KR] Rep. of Korea .......... 94-9476

[51] Int. Cl.$^6$ ...................................... H04N 7/30
[52] U.S. Cl. .......................... 348/405; 348/403
[58] Field of Search .................... 348/395, 403, 348/404, 405, 419, 420, 411; 382/232, 233, 248, 250, 251

[56] References Cited

U.S. PATENT DOCUMENTS

| 5,025,482 | 6/1991 | Murakami et al. | 382/251 |
| 5,136,371 | 8/1992 | Savatier et al. | 348/419 |
| 5,357,282 | 10/1994 | Lee | 348/403 |

*Primary Examiner*—Amelia Au
*Attorney, Agent, or Firm*—Anderson Kill & Olick PC

[57] ABSTRACT

An apparatus for decoding an encoded digital image signal having a data signal and an information signal, wherein the data signal includes a plurality of blocks of quantized transformed coefficients, each of the blocks including a DC coefficient and a predetermined number of AC coefficients, and said information signal includes each QS for each of the blocks, includes: an inverse quantizer for performing an inverse quantization on a subjective block with its corresponding QS to produce an inverse quantized DC coefficient and a plurality of inverse quantized AC coefficients; a candidate DC coefficient generator for determining a DC coefficient range and altering the value of the inverse quantized DC coefficient within the range to generate a predetermined number of candidate DC coefficients; a number of inverse discrete cosine transformer for performing inverse discrete cosine transformation on each of the candidate DC coefficients combined with the inverse quantized AC coefficients; and a comparator for comparing each of the results from the IDCT with previously performed IDCT results so as to enable the selection of an IDCT result producing a minimum blocking effect which occurs because of a luminance pixel difference between the previously performed IDCT results and the selected IDCT result.

2 Claims, 2 Drawing Sheets

$$BD = \sum_{j=1}^{8} |A(1,j) - B(8,j)|$$
$$+ \sum_{i=1}^{8} |A(i,1) - C(i,8)|$$

VIDEO SIGNAL DECODING APPARATUS CAPABLE OF REDUCING BLOCKING EFFECTS

FIELD OF THE INVENTION

The present invention relates to an apparatus for decoding an encoded video signal; and, more particularly, to an apparatus for decoding an encoded video signal with reduced blocking effects.

DESCRIPTION OF THE PRIOR ART

In various electronic/electrical applications such as high definition television and video telephone systems, a video signal may need be transmitted in a digitized form. When the video signal comprising a sequence of video "frames" is expressed in a digitized form, there is bound to occur a substantial amount of digital data, for each line of a video frame is defined by a sequence of digital data elements referred to as "pixels". Since, however, the available frequency bandwidth of a conventional transmission channel is limited, in order to transmit the substantial amount of digital data through the channel, the use of a video signal encoding apparatus may become necessary to compress or reduce the volume of the data to be transmitted.

The video signal can be normally compressed without seriously affecting its integrity because there usually exist certain correlationships or redundancies among some of the pixels in a single frame and also among those of neighboring frames. Among various video compression techniques, the so-called hybrid coding technique, which combines temporal and spatial compression techniques together with a statistical coding technique, is known to be most effective.

Most hybrid coding techniques employ an adaptive inter/intra mode coding, orthogonal transform, quantization of transform coefficients, and VLC(variable length coding). The adaptive inter/intra-mode coding is a process of selecting a video signal for a subsequent orthogonal transform from either PCM(pulse code modulation) data of a current frame or DPCM (differential pulse code modulation) data adaptively, e.g., based on a variance thereof. The inter-mode coding, also known as the predictive method, which is based on the concept of reducing the redundancies between neighboring frames, is a process of determining the movement of an object between a current frame and its one or two neighboring frames, and predicting the current frame according to the motion flow of the object to produce a difference signal representing the difference between the current frame and its prediction. This coding method is described, for example, in Staffan Ericsson, "Fixed and Adaptive Predictors for Hybrid Predictive/Transform Coding", *IEEE Transactions on Communications, COM*-33, No. 12(December 1985); and in Ninomiya and Ohtsuka, "A Motion-Compensated Interframe Coding Scheme for Television Pictures", *IEEE Transactions on Communications, COM*-30, No. 1(January 1982), both of which are incorporated herein by reference.

The orthogonal transform, which exploits the spatial correlationships between image data such as PCM data of the current frame and motion compensated DPCM data and reduces or removes spatial redundancies therebetween, is used to convert a block of digital image data into a set of transform coefficients. This technique is described in Chen and Pratt, "Scene Adaptive Coder", *IEEE Transactions on Communications, COM*-32, No. 3(March 1984). By processing such transformation coefficient data with quantization and VLC, the amount of data to be transmitted can be effectively compressed.

Specifically, in the orthogonal transform such as DCT-(discrete cosine transform) or the like, the image data is divided into equal-sized blocks, for example, blocks of 8×8 pixels, and each of the blocks is transformed from the spatial domain to the frequency domain. As a result, one DC coefficient and a plurality of(e.g., 63) AC coefficients are obtained for each of the blocks. The DC coefficient of the block reflects the average intensity of the pixels in the block. In general, the intra-mode input video signal has values ranging from 0 to 255, giving a dynamic range for the intra-block DC transform coefficient from 0 to 2040 which can be represented in 11 bits; and a maximum dynamic range for any intra-block AC transform coefficient from about −1000 to 1000. In case of an inter-mode input video signal which has values ranging from −255 to 255, a maximum dynamic range for any AC or DC transform coefficient is about −2000 to 2000.

The orthogonal transform coefficients resulting from the orthogonal transform are then quantized. In carrying out the quantization, a smaller quantizer step size obviously entails a larger amount of data requiring a larger number of code bits for the representation thereof, whereas a larger quantizer step size results in a lower volume of data needing a fewer number of code bits for their representation. And, a larger number of code bits can represent an image more precisely than a fewer number of code bits. Accordingly, there exists a tradeoff between the amount of data or burden thrust upon a transmission channel and the quality of the image transmitted.

There are various quantization step size control schemes. In these schemes, the quantizer step size control usually means the control of the step size employed in quantizing inter-block AC and DC, and intra-block AC coefficients. Such quantizer step size control is determined based on the amount of data currently stored in a buffer memory and the complexity of the input video signal. In case of the intra-block DC coefficient, it is quantized with a relatively small fixed step size, e.g., 8, as disclosed in the MPEG-1 standard or with a variable step size, e.g., 1, 2, 4, or 8, which can be adaptively adjusted for a picture (the term "picture" used herein denotes "field" or "frame" of a video signal) but fixed within the picture as recommended in the MPEG-2 standard. That is, the intra-block DC coefficient is quantized uniformly at least within a picture without a due regard paid to the details of the image, e.g., intensity thereof, in the picture, which may lower the image quality due to, e.g., a "blocking effect".

The blocking effect is a phenomenon wherein the border line of a block becomes visible at the receiving end. Such blocking effect occurs since a frame is encoded in units of blocks; and may become more serious as the quantizer step size becomes larger, i.e., as the blocks undergo more coarse quantization. Accordingly, if a certain block is much brighter or darker than its adjacent block, and, a fixed large quantizer step size is used for the intra-block DC coefficient, the intensity difference between said certain block and its adjacent blocks may become even more pronounced, resulting in a more severe blocking effect and reducing the quality of the image. In addition, in the inter-mode coding with motion compensated frame prediction, blocking effects are not so disturbing, but are still noticeable.

SUMMARY OF THE INVENTION

It is, therefore, a primary object of the invention to provide an improved apparatus for decoding an encoded video signal having the capability of reducing blocking effects.

In accordance with the invention, there is provided an apparatus for decoding an encoded digital image signal having a data signal and an information signal, wherein the data signal includes a plurality of blocks of quantized transformed coefficients which are outputs from an encoder performing discrete cosine transformation(DCT) of a digital image signal and quantization of the results from the DCT with a quantization step size(QS), each of the blocks including one DC coefficient and a predetermined number of AC coefficients, and said information signal includes each QS of the blocks, comprising:

means for performing an inverse quantization on a subjective block with its corresponding QS to produce an inverse quantized DC coefficient and a plurality of inverse quantized AC coefficients;

means responsive to said inverse quantized DC coefficient and the corresponding QS for determining a DC coefficient range in which all of the DC coefficients are mapped into said inverse quantized DC coefficient, and altering the value of the inverse quantized DC coefficient within the range to generate a predetermined number of candidate DC coefficients;

means for performing an inverse discrete cosine transformation(IDCT) on each of the candidate DC coefficients combined with the inverse quantized AC coefficients; and means for comparing each of the results of the IDCT with previously performed reference IDCT results so as to enable the selection of one IDCT result producing a minimum blocking effect which occurs because of a luminance pixel difference between the reference IDCT results and the selected IDCT result.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
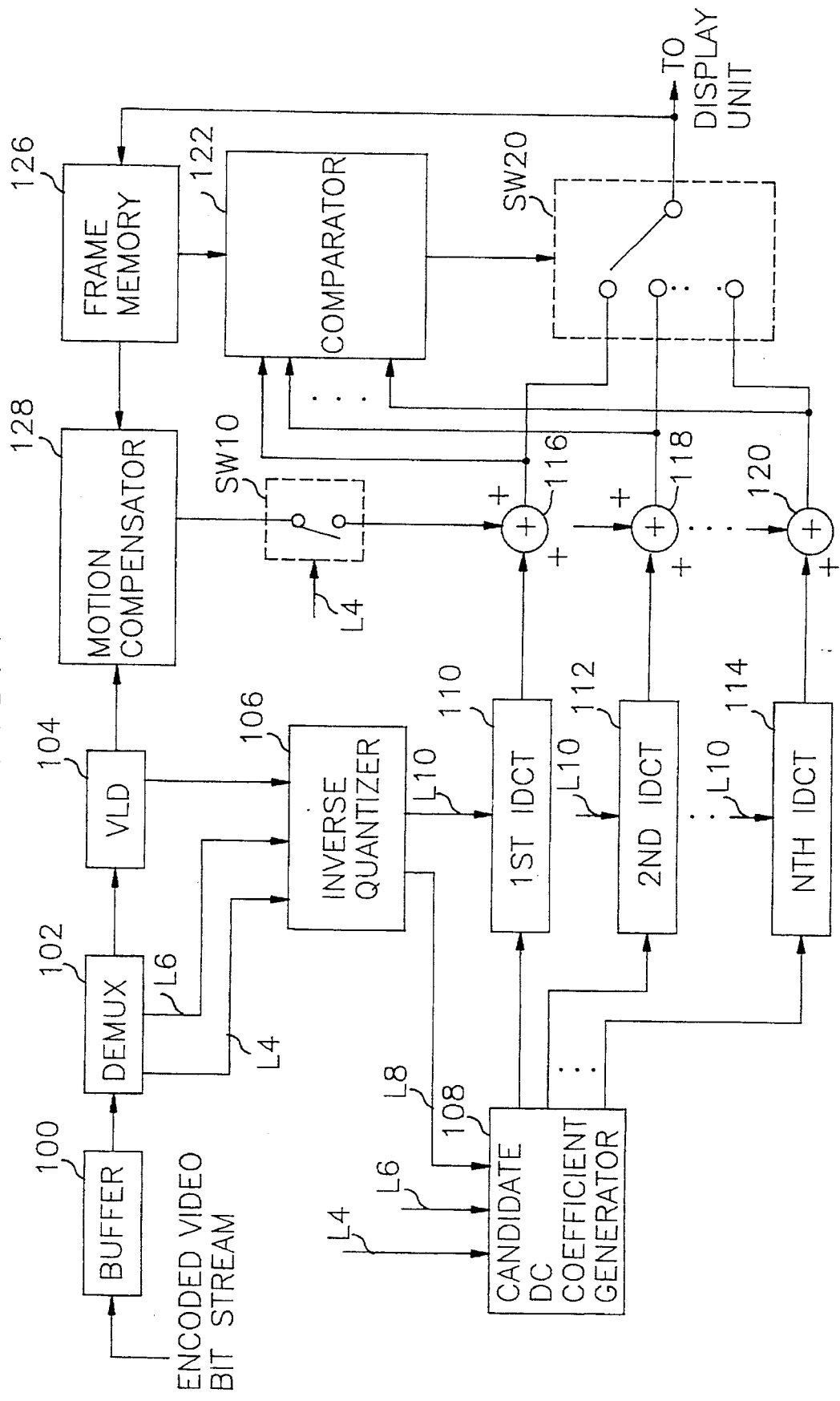
FIG. 1 is a video signal encoding apparatus having the capability of reducing blocking effects in accordance with the present invention.

Referring to FIG. 1, there is shown a preferred embodiment of an encoded video signal decoding apparatus capable of reducing blocking effects in accordance with the present invention. As shown in FIG. 1, an encoded video bit stream is provided from a corresponding conventional encoder(not shown) to the decoding apparatus, in particular, to a buffer 100.

The buffer 100 receives the encoded video bit stream and supplies it at a fixed rate to a demultiplexer 102 wherein the encoded video bit stream is demultiplexed to produce a decoding information signal such as an inter/intra mode signal and a quantization step size(QS), and encoded image data, i.e., a set of variable length coded transform coefficients and motion vectors. The inter/intra mode signal and the QS are applied to an inverse quantizer 106 and a candidate DC coefficient generator 108, simultaneously, and the set of variable length coded transform coefficients and the motion vectors are supplied to a variable length decoder(VLD) 104. The VLD 104 decodes the set of variable length coded transform coefficients and the motion vectors and provides quantized discrete cosine transform coefficients(Qfs) to an inverse quantizer 106 and motion vectors to a motion compensator 128. The Qfs for each of the blocks included in the encoded video bit stream include one DC coefficient and 63 AC coefficients.

At the inverse quantizer 106, a block of Qfs is converted into a set of DCT coefficients in response to the intra/inter mode signal via a line L4 and the QS via a line L6 provided from the demultiplexer 102, respectively. Subsequently, among the converted set of DCT coefficients, the DC coefficient is provided through a line L8 to the candidate DC coefficient generator 108, and the AC coefficients are fed through a line L10 to N number of inverse discrete cosine transformers(IDCTs) 110, 112 and 114.

The candidate DC coefficient generator 108, responsive to an inverse quantized DC coefficient and the corresponding QS, determines a DC coefficient range wherein all of the DC coefficients within the range have been mapped into said inverse quantized DC coefficient during the quantization process in the encoder, and alters the value of the inverse quantized DC coefficient within the range, to thereby generate a predetermined number of candidate DC coefficients. For example, the DC coefficient range is determined as follows:

$$-\tfrac{1}{2}\times QS+DC \leq R < \tfrac{1}{2}\times QS+DC \qquad \text{Eq. (1)}$$

wherein R is the DC coefficient range, QS is the quantization step size and DC is the inverse quantized DC coefficient. The candidate DC coefficients are supplied to the IDCTs 110, 112 and 114, one by one.

Each of the IDCTs 110, 112 and 14 transforms a set of DCT coefficients including one candidate DC coefficient and the AC transform coefficients into a block of IDCT data signal which is provided to each of corresponding adders 116, 118 and 120.

In the meanwhile, the motion compensator 128 extracts corresponding pixel data from a previous frame stored in a frame memory 126 based on the motion vectors from the VLD 104 and provides the extracted pixel data as a motion compensated data signal to a switch SW10.

At each of the adders 116, 118 and 120, the motion compensated data signal is provided thereto via the switch SW10 from the motion compensator 128. The motion compensated data signal is added, or not added, with the IDCT data signals by switching the SW10 according to the inter/intra mode signal, to thereby provide decoded data signals. In case of the inter mode, each IDCT data signal from the IDCTs 110, 112 and 114 is added with the motion compensated data signal. In case of the intra mode, each IDCT data signal from the IDCTs 110, 112 and 114 is provided through each of the adders 116, 118 and 120 to a comparator 122 and a switch SW20 without any adding operation.

Figure 2A:
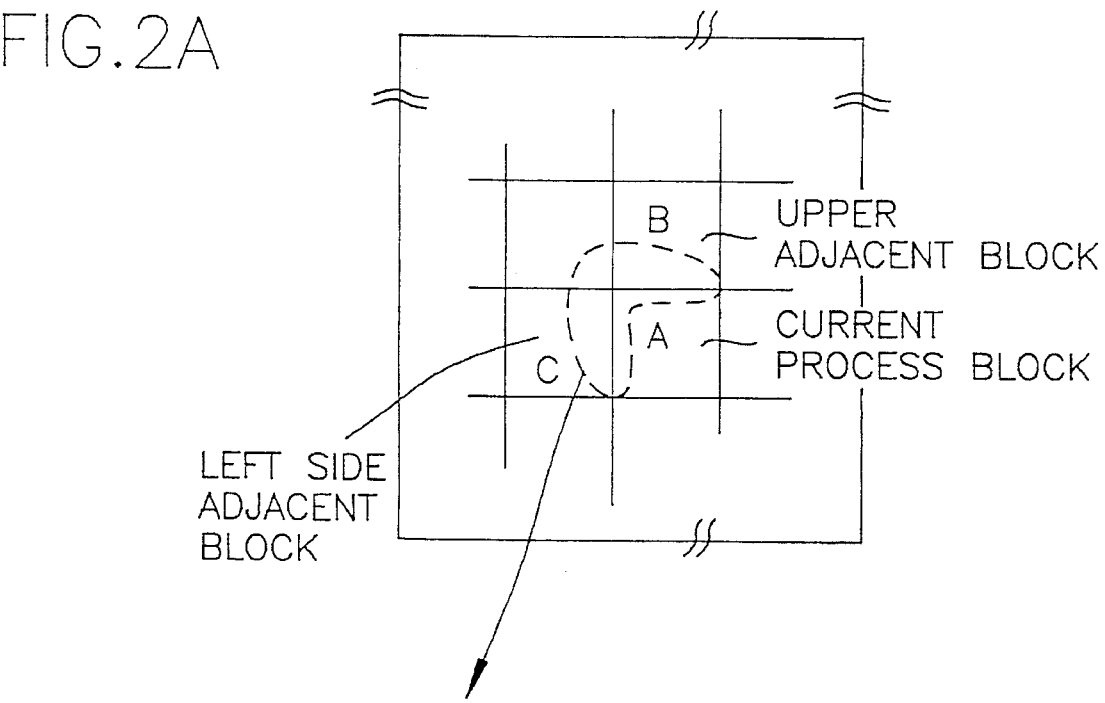
FIGS. 2A and 2B show an exemplary frame so as to describe the operation of the comparator shown in FIG. 1.
Figure 2B:
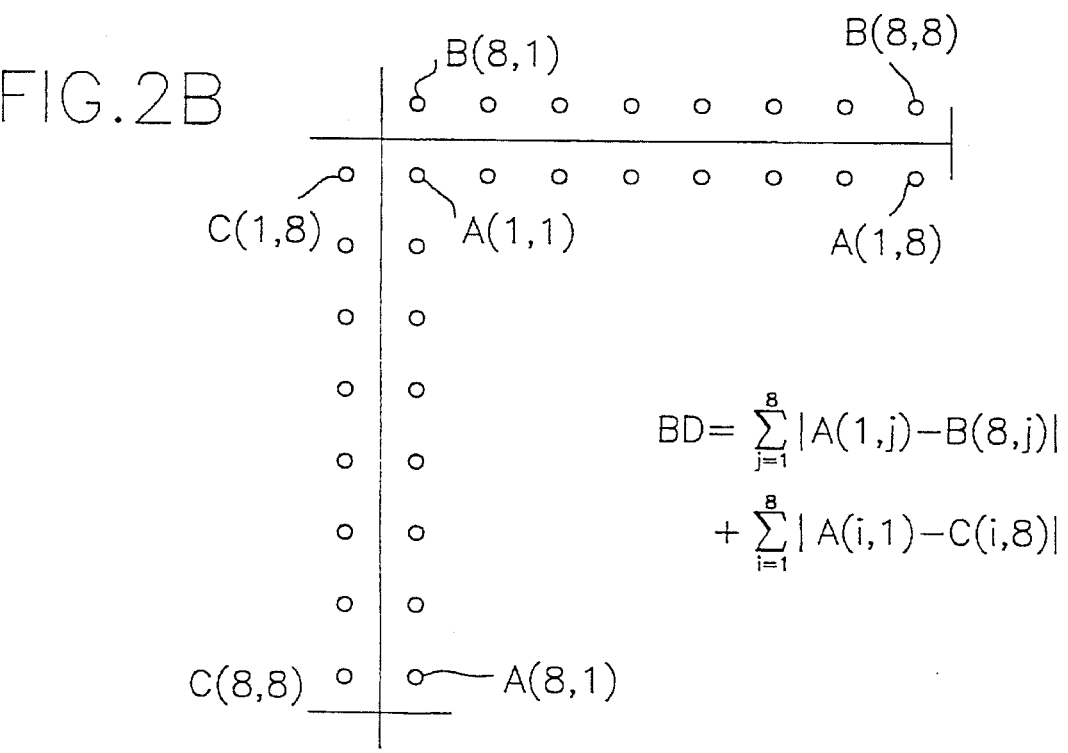

The comparator 122 compares each of the decoded data signals from the adders 116, 118 and 120, with a previously decoded data signal stored in the frame memory 126 to select one decoded data signal so as to produce a minimum blocking effect which occurs because of luminance pixel differences between the previously decoded data signal and the selected decoded data signal. Referring to FIG. 2A and FIG. 2B, there is shown a comparing method for selecting one decoded data signal by calculating a border difference which directly relates to the blocking effects. The border difference is defined as follows:

$$BD = \sum_{j=1}^{8} |A(1,j) - B(8,j)| + \sum_{i=1}^{8} |A(i,1) - C(i,8)| \quad \text{Eq. (2)}$$

wherein BD is the border difference, A(i,j) is a luminance value of a current process block, B(i,j) is a luminance value of a upper adjacent block, C(i,j) is a luminance value of a left side adjacent block. As shown in Eq. (2), the border difference is the summation of the luminance differences between pixels positioned along the border lines of the blocks. The selected decoded data signal is the one having the minimum border difference.

After selecting the decoded data signal, the comparator 122 produces a switch control signal to a switch SW20 so that the selected decoded data signal is provided to a display unit(not shown) and stored at the frame memory 126.

While the present invention has been shown and described with reference to the particular embodiments, it will be apparent to those skilled in the art that many changes and modifications may be made without departing from the spirit and scope of the invention as defined in the appended claims.

What is claimed is:

1. An apparatus for decoding an encoded digital image signal having a data signal and an information signal, wherein the data signal includes a plurality of blocks of quantized transformed coefficients which are outputs from an encoder performing a discrete cosine transformation-(DCT) of a digital image signal and a quantization of the results from the DCT with a quantization step size(QS), each of the blocks including a DC coefficient and a predetermined number of AC coefficients, and said information signal includes each QS for each of the blocks, comprising:

means for performing an inverse quantization on a subjective block with its corresponding QS to produce an inverse quantized DC coefficient and a plurality of inverse quantized AC coefficients;

means, responsive to the inverse quantized DC coefficient and the corresponding QS, for determining a DC coefficient range in which all of the DC coefficients are mapped into the inverse quantized DC coefficient, and altering the value of the inverse quantized DC coefficient within the range to generate a predetermined number of candidate DC coefficients;

means for performing an inverse discrete cosine transformation(IDCT) on each of the candidate DC coefficients combined with the inverse quantized AC coefficients; and means for comparing each of the results from the IDCT with previously performed IDCT results, so as to enable the selection of an IDCT result producing a minimum blocking effect which occurs because of a luminance pixel difference between the previously performed IDCT results and the selected IDCT result.

2. The apparatus of claim 1, wherein said DC coefficient range is determined as follows:

$$-\frac{1}{2} \times QS + DC \leq R < \frac{1}{2} \times QS + DC$$

wherein R is the DC coefficient range, QS is the quantization step size and DC is the inverse quantized DC coefficient.

* * * * *